Aug. 18, 1936.   T. E. WOOD   2,051,431
GAS BURNER
Filed May 31, 1934   3 Sheets-Sheet 1
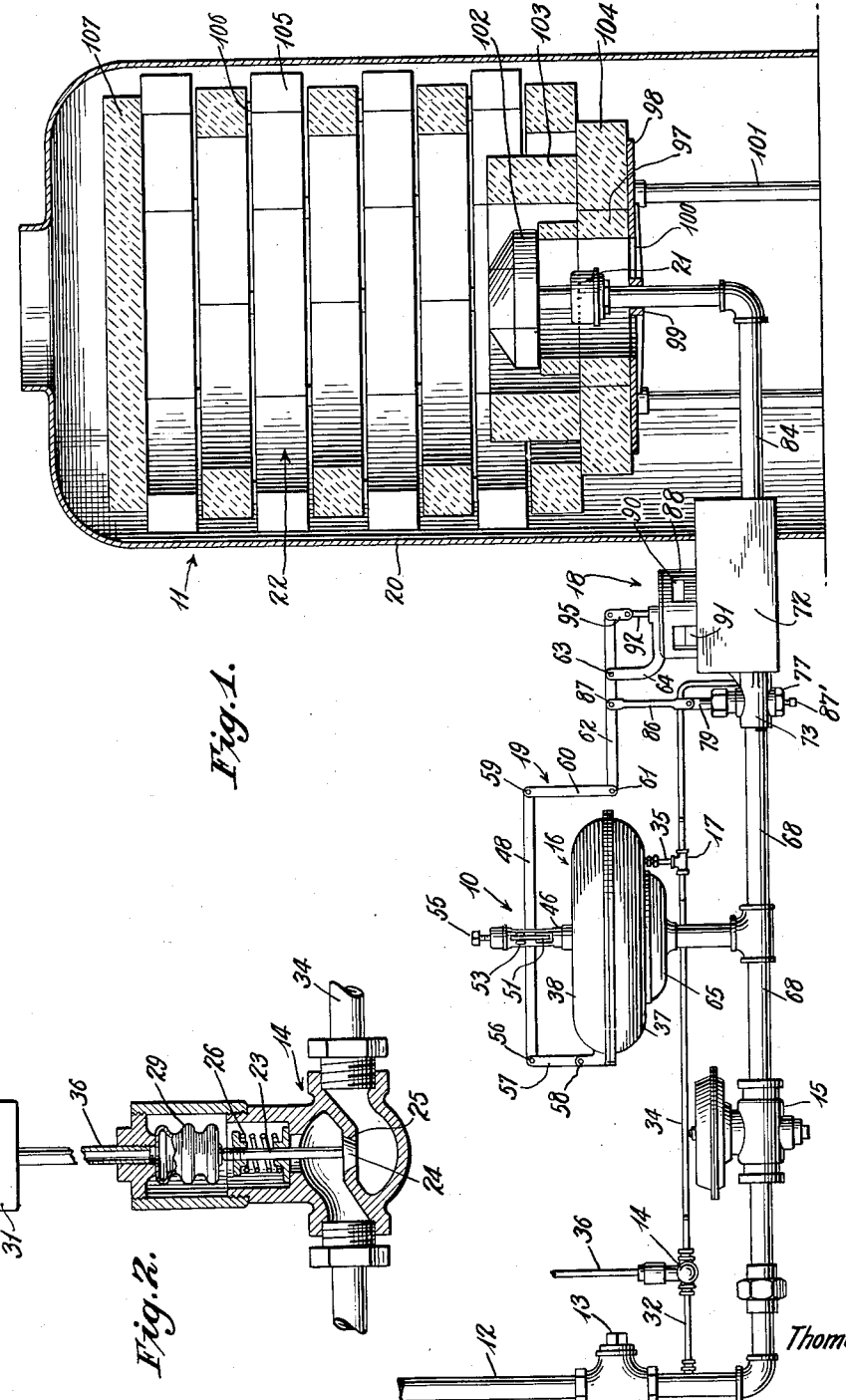
Inventor
Thomas E. Wood
By Bacon & Thomas
Attorneys Aug. 18, 1936.     T. E. WOOD     2,051,431
GAS BURNER
Filed May 31, 1934     3 Sheets—Sheet 2
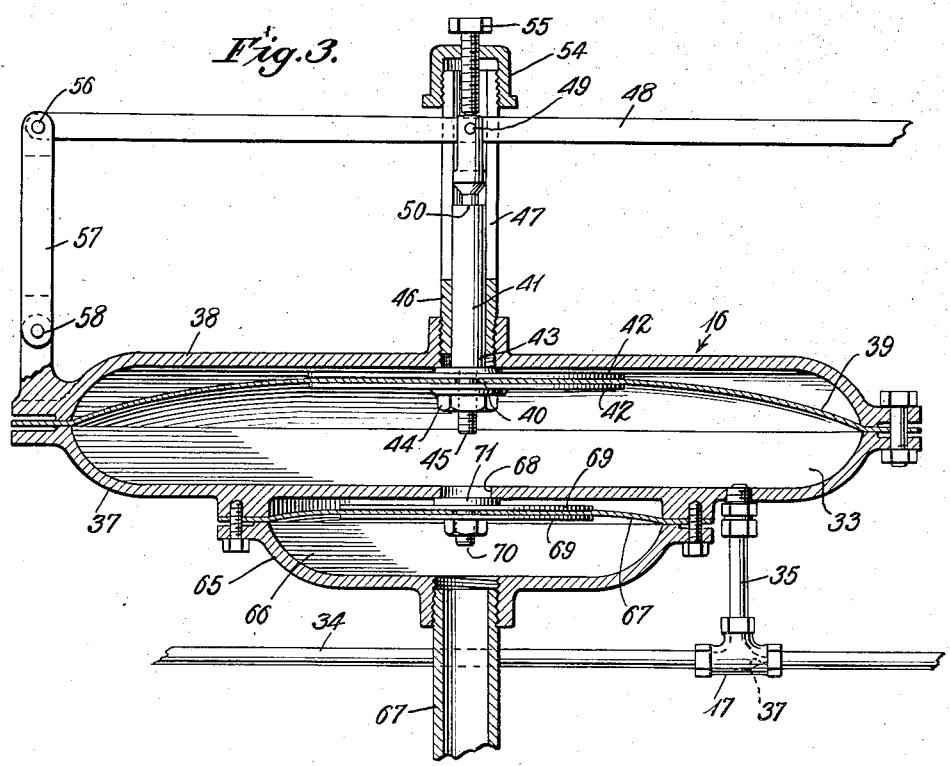
Fig. 3.
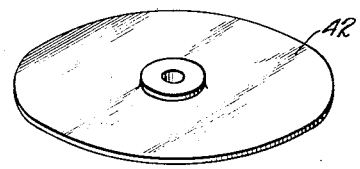
Fig. 4.
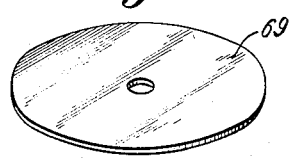
Fig. 5.
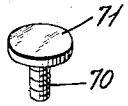
Fig. 6.
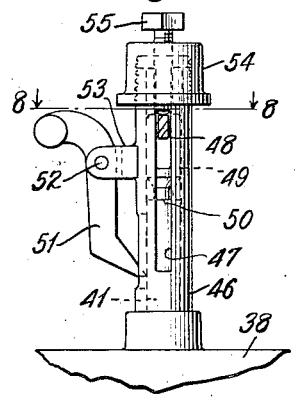
Fig. 7.
Fig. 8.
Inventor
Thomas E. Wood
By Bacon & Thomas
Attorneys Aug. 18, 1936.  T. E. WOOD  2,051,431
GAS BURNER
Filed May 31, 1934  3 Sheets-Sheet 3
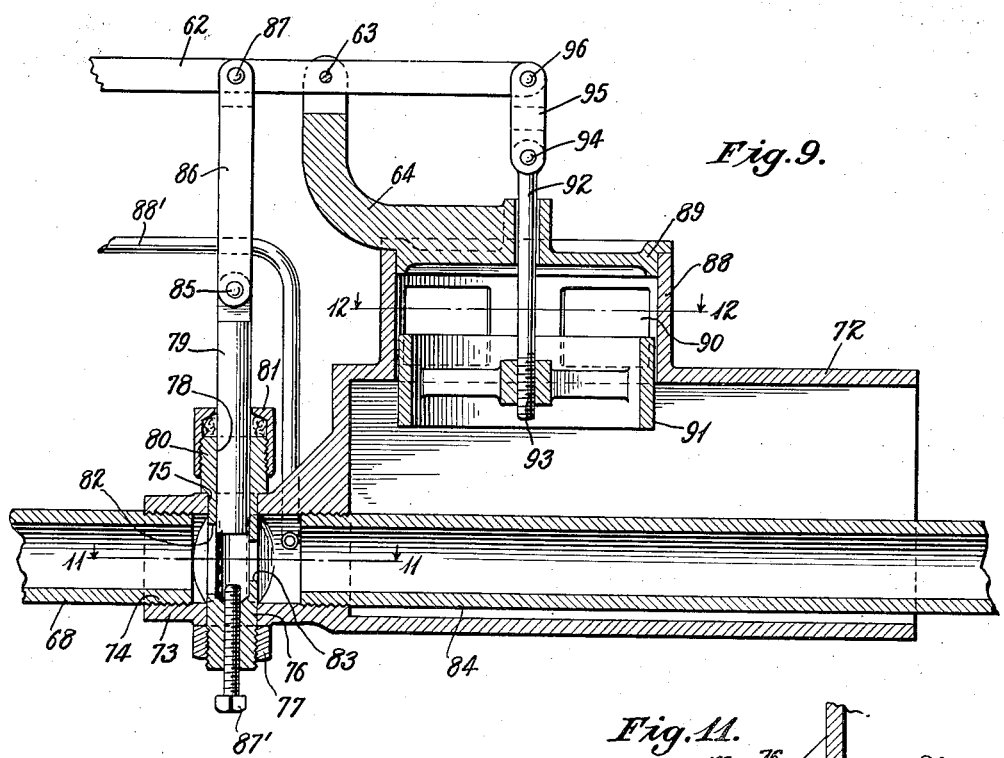
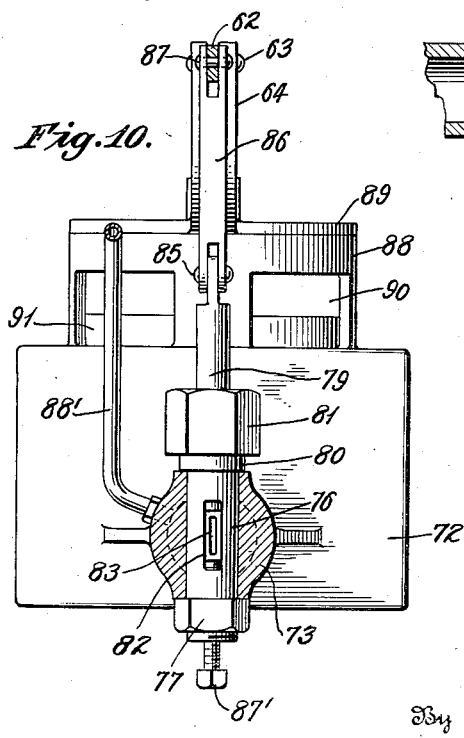
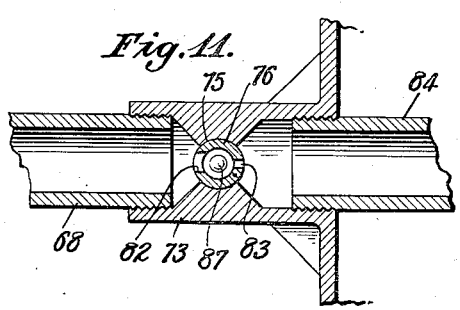
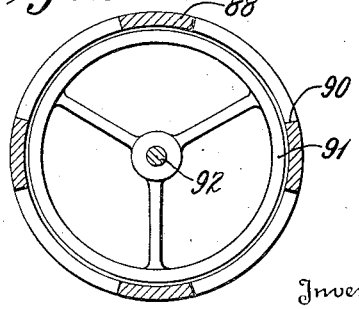
Inventor
Thomas E. Wood
By Bacon & Thomas
Attorneys Patented Aug. 18, 1936

2,051,431

UNITED STATES PATENT OFFICE 2,051,431

GAS BURNER

Thomas Eugene Wood, Pittsburgh, Pa., assignor to The Manufacturers Light and Heat Company, Pittsburgh, Pa., a corporation of Pennsylvania Application May 31, 1934, Serial No. 728,417

6 Claims. (Cl. 236—1)

This invention relates to gas burners and more particularly to a device for burning gas at high temperatures and absorbing the heat therefrom by radiation, and to controlling the amount of gas supplied to the burner in accordance with the temperature produced.

One object of the invention is to provide a gas burner for converting a coal fired furnace into a gas fired furnace so as to supply heat from the burner to the furnace or boiler walls or tubes by radiation.

Another object of the invention is to automatically regulate the amount of gas supplied to the burner in accordance with the temperature produced by the heat from the furnace or boiler.

Another object of the invention is to provide a thermostatically controlled device for automatically regulating the amount of gas and air supplied to a furnace in accordance with the temperature of a room heated by said furnace.

A further object is to utilize the pressure of the gas supplied to the furnace for operating the gas or air regulating device.

A still further object of the invention is to provide a safety device for disconnecting said burner from the gas supply in the event of gas pressure failure with consequent failure of a pilot flame and maintaining said burner disconnected until said device is manually released.

Other objects and advantages of the invention will appear in the following description of the drawings in which:

Figure 1 is an assembly drawing partly in section;

Figure 2 is a detail of the thermostatically operated valve;

Figure 3 is a vertical cross section of the regulating diaphragm and safety diaphragm chambers;

Figure 4 is a detail in perspective of the regulating diaphragm washer;

Figures 5 and 6 are details in perspective of a safety diaphragm washer and screw respectively;

Figure 7 is a detail of the connections to the regulating diaphragm showing the safety latch;

Figure 8 is a horizontal cross section taken on line 8—8 of Figure 7;

Figure 9 is a horizontal cross section of the air and gas valve assembly;

Figure 10 is an end elevation partly in section of the air and gas valve assembly looking toward the right in Figure 9;

Figure 11 is a horizontal cross section of the gas valve taken on line 11—11 of Figure 9; and Figure 12 is a horizontal cross section of the air valve taken on line 12—12 of Figure 9.

Referring more particularly to the drawings, 10 indicates in general the gas and air regulating mechanism and 11 indicates in general the furnace. The gas and air regulating mechanism includes a gas intake pipe 12, an intake valve 13, a thermostatic orifice valve 14, a pressure regulator 15, a controller 16, an orifice member 17, a gas and air valve assembly 18 and linkage 19 between the controller 16 and the gas and air valve assembly 18. The furnace includes furnace walls 20, a gas burner 21 and a refractory combustion chamber 22.

The gas inlet pipe 12 is connected to the pressure regulator 15 through the shut-off valve 13. The pressure regulator 15 is effective to reduce the gas pressure of the inlet pipe 12 to a lower, substantially constant pressure suitable for supplying the burner 21. This pressure reducer may be of any conventional form and will not be described in detail. The thermostatic valve 14 as shown in Figure 2 comprises a spring retracted valve member 23 having a head 24 which may close an orifice 25. The valve member 23 is biased to open position by a spring 26. The valve member 23 may be operated by an expanding bellows 29 connected by means of a tube 30 to a liquid chamber 31 positioned in a room being heated by the furnace or at any other position, the temperature of which is influenced by the heat from the furnace 11. The thermostatic valve 14 is connected to the gas pressure supply through a tube 32 and has its other side connected to the regulating diaphragm chamber 33, contained in the controller 16, by means of tubes 34 and 35 through a fitting 17 which is provided with a bleeder orifice 36.

As shown in Figure 3, the controller 16 comprises a central circular member 37 having a concave upper surface and a circular cover member 38 having a concave lower surface, defining between them the regulating diaphragm chamber 33. A disk-shaped regulating diaphragm 39 has its edges positioned between the central member 37 and the cover member 38 which are secured together in gas-tight relationship. The diaphragm 39 has a central aperture 40 through which extends a control plunger 41 which is secured to the diaphragm by washers 42 positioned above and below the diaphragm 39 and between a shoulder 43 and a nut 44 screwthreaded upon a threaded extension 45 of the controller plunger 41. The controller plunger 41 extends upwardly through a sleeve 46 screw-threaded into a central aperture in the cover member 38. The sleeve 46 is provided with diametrically opposed slots 47 through which extends a link 48, forming part of the linkage 19. The link 48 is pivoted at 49 intermediate its ends to the upper end of the plunger 41. The plunger 41 is also provided with a shoulder 50 which is engaged by the gravity actuated safety latch 51 to maintain the diaphragm in its lowermost position after the failure of gas pressure as will be hereafter more clearly explained. The safety latch 51 is pivotally mounted at 52 on a bracket 53 carried by the sleeve 46. The sleeve 46 is provided at its upper end with a threaded cap 54 having an axial threaded aperture receiving an adjusting screw 55 for adjusting the upper limit of travel of the plunger 41.

The link 48 has one end pivotally connected at 56 to the upper end of a vertical link 57 which has its other end pivotally connected at 58 to the peripheral edge of the cover member 38. The other end of the link 48 is pivotally connected at 59 to the upper end of a vertical link 60 which has its lower end pivotally connected at 61 to one end of a lever 62 which is pivotally connected at 63 to a bracket 64 carried by the air and gas valve assembly 18.

The controller 16 also includes a lower circular member 65 having an upper concave surface. The lower member 65 is attached to the lower side of the central member 37 so as to provide a safety diaphragm chamber 66 between the members 37 and 65. The edge of a circular safety diaphragm 67 is positioned between the members 37 and 65 so as to divide the chamber 66. The central member 37 is provided with a central aperture 68 through which the threaded extension 45 of the controller plunger 41 may extend when the diaphragm 39 is in its lowermost position. The diaphragm 67 is provided with circular washers 69 positioned upon opposite sides of the diaphragm and secured in position by means of a bolt 70 extending through the diaphragm and washers and provided with a head 71 adapted to contact with the extension 45 of the plunger 41. The safety diaphragm chamber 66 is connected by means of a pipe 67 with a pipe 68 leading from the pressure regulator 15 to the gas and air valve assembly 18.

The gas and air valve assembly 18 comprises a housing 72 extending through the wall 20 of the furnace 11. The housing 72 is provided with an extension 73 which is screw-threaded internally at 74 to receive one end of the pipe 68. The extension 73 is also provided with a vertical bore 75 to receive a bushing 76 extending through said bore and retained in position by means of a nut 77 screw-threaded upon the lower end thereof. The bushing 76 is provided with a bore 78 to receive a gas valve plunger 79. The bushing 76 is further provided with an enlarged head 80 which is screw-threaded to receive a packing nut 81 to provide for a gas-tight sliding connection between the bushing 76 and the plunger 79. The bushing 76 is further provided with diametrically opposed apertures 82 and 83 which are aligned respectively with the pipe 68 and a pipe 84 extending through the housing 72 to the burner 21. The plunger 79 is pivotally connected at 85 with a vertical link 86 pivotally connected at 87 with the lever 62. An adjusting screw 87' extends axially into a screw-threaded bore in the lower end of the bushing 76 and functions as an adjustable stop to determine the minimum closing of the gas valve. It will be noted that the discharge from the bleeder orifice 36 is conducted to the pipe 84 through a pipe 88'.

The housing 72 of the air and gas valve assembly 18 is further provided with an upwardly extending circular projection forming an air valve housing 88. The air valve housing 88 carries an air valve housing cover 89 which is integral with the bracket 64 supporting the lever 62. The housing 88 is provided with enlarged apertures 90 for the admission of air into the housing 72. A circular valve 91 is vertically slidable within the air valve housing 88 to determine the amount of air admitted and is carried by an axial plunger 92 screw-threaded at 93 into the center of the valve 91. The plunger 92 extends upwardly through the cover 89 and is pivotally connected at 94 to one end of a link 95 which has its other end pivotally connected at 96 to one end of the lever 62.

In operation, gas is delivered from the pipe 12 through the pressure regulator 15 to the gas valve 73 and then through the pipe 84 to the burner 21. Air is supplied through the air valve 88 into the chamber 72 and thence into the furnace 11. The pressure regulator 15 supplies gas at constant pressure to the gas valve 73 and also to the safety diaphragm chamber 66. It will be noted that the orifice 25 of the thermostatic control valve 14 and the orifice 36 of the fitting 17 are connected in series between the gas supply pipe 12 and the pipe 84 leading to the burner 21. Also the controller diaphragm chamber 33 is connected between the orifices 25 and 36 so that pressure in the pipe 34 between these orifices will tend to raise the diaphragm 39. Since the orifice 36 is a constant size, an increase in the area of the orifice 25 will cause an increase in pressure in the diaphragm chamber 33 and an upward movement of the diaphragm 39 which, through the controller plunger 41 and the linkage 19, will raise the gas valve plunger 79 to admit more gas to the burner and lower the air valve plunger 92 to admit more air to the furnace. It will be noted from Figure 2 that an increase in temperature upon the liquid in the chamber 31 will cause an expansion thereof and a movement of the thermostatic valve plunger 23 in a direction to close the orifice 25. This will cause a drop in the pressure in the regulating diaphragm chamber 33 which will result in the downward movement of the control plunger 41 due to gravity and a closing motion of the gas and air valve plungers to decrease the amount of air and fuel supplied to the furnace. The adjusting screw 87' of the gas valve limits the closing motion of the gas valve plunger 29 so as to provide a minimum supply of gas to the burner so as to maintain a small flame functioning as a pilot flame. The same adjusting screw 87' acts through the linkage 19 to maintain a minimum supply of air for the pilot flame. This minimum supply of air may be further adjusted by adjusting the air valve 91 or its plunger 92. Also the adjusting screw 55 at the top of the controller plunger sleeve 47 determines the maximum opening of the gas and air valves.

The safety diaphragm chamber 66 is supplied with gas under pressure from the pipe 68 whenever gas is being supplied under pressure to the device through the pipe 12. The gas pressure in chamber 66 maintains the safety diaphragm 67 in its uppermost position and the head 71 of the screw 70 acts to limit the downward motion of the diaphragm 39 in normal operation. If the gas pressure in pipe 12 fails the pressure in chamber 66 will also fail. The safety diaphragm 67 will move downwardly by gravity. The failure of gas pressure in pipe 12 will also cause a pressure failure in chamber 33 and diaphragm 39 will move downward under the influence of gravity sufficiently for the safety catch 51 to engage above the shoulder 50 upon the control plunger 41. This completely locks the gas and air controlling apparatus out of operation such that large quantities of gas cannot be supplied to the burner until the safety catch 51 is manually released.

The burner 21 is surrounded by a baffle head support 97 of refractory material which is in turn supported by a metallic furnace ring 98 having a central aperture 99 through which extends the gas pipe 84. The burner ring 98 is further provided with apertures 100 for supplying air to the burner 21 and is supported upon legs 101 resting upon the furnace bottom. A baffle head 102 of refractory material rests upon the baffle head support 97 above the burner and a baffle ring 103 of refractory material surrounds the baffle head and baffle head support and is supported upon a ring of refractory material 104 which is in turn supported upon the furnace ring 98. The combustion chamber 22 comprises a series of courses of refractory material 105 forming a hollow checker-work supported upon the refractory ring 104. Spacers 106 are provided between the courses 105 to permit the products of combustion to escape between said courses and the entire refractory combustion chamber 22 is covered by a refractory slab 107.

In the operation of the furnace, the gas and air are mixed adjacent the burner 21 and are burned within the refractory combustion chamber 22 above and surrounding the baffle head 102. During the process of combustion the gas is burned at a sufficiently high temperature to crack the gas and liberate particles of free carbon because of the heating of the refractory combustion chamber and the extremely high temperature maintained therein. As combustion progresses further, the burning gases surrounding these particles of free carbon bring them to incandescence, thereby causing them to give off the heat liberated in combustion by radiation. The refractory material of the combustion chamber 22 receives this heat and in turn transmits it to the furnace or boiler walls 20 by radiation. Also the hot products of combustion escape through the spaces between the refractory courses 105 to come in contact with the furnace walls 20. It will thus be seen that heat is transmitted to the boiler walls in a manner entirely analogous to the radiation from a coal fire and the hot products of the combustion therefrom. While the embodiment of the invention herein disclosed is particularly applicable to domestic heating and is particularly useful in converting a coal fired furnace to a furnace adapted to burn gas, it is to be understood that the invention may be used other than for domestic heating and that the type of combustion chamber disclosed is capable of transmitting heat to heat absorbing devices other than the furnace walls. It is further to be understood that the invention is not limited to the precise details herein disclosed but that modifications may be made within the scope of the following claims:

I claim as my invention:

1. In a gas furnace, a gas burner, positioned in said furnace, a source of gas supply under pressure, a gas conduit between said supply and said burner and having a gas regulating valve therein, air conduit for supplying air to said furnace to mix with said gas at said burner, an air regulating valve in said air conduit, a temperature responsive means positioned to be influenced by heat from said furnace, means actuated by said temperature responsive means for operating said gas and air regulating valves to simultaneously decrease the amount of gas and air supplied to said furnace when the temperature adjacent said temperature responsive means increases, means to close said gas and air valves upon failure of said gas pressure, and means to lock said valves in closed position until manually released.

2. A device for regulating the supply of gas to a gas burner comprising, a gas conduit from a source of gas supply under pressure to said burner, a gas regulating valve in said conduit, a diaphragm chamber, a gas regulating diaphragm in said chamber for operating said valve, said diaphragm being subjected to gas pressure, temperature responsive means for controlling the gas pressure upon said diaphragm, a second diaphragm in said chamber for limiting the valve closing movement of said regulating diaphragm, said second diaphragm being subjected to the gas pressure of said conduit on the inlet side of said valve.

3. A device for regulating the supply of gas to a gas burner comprising a gas conduit from a source of gas under pressure, said conduit having a gas regulating valve therein, fluid pressure operated means for actuating said regulating valve, temperature responsive means for controlling said fluid pressure, a gas pressure operated means for limiting the valve closing movement of said fluid pressure operated means, said gas pressure operated means being subjected to the gas pressure of said conduit on the inlet side of said valve.

4. In a device for controlling the amount of gas delivered to a gas burner from a source of gas under pressure, a conduit from said source to said burner, a pressure reducer and a gas regulating valve in said conduit, a second conduit bypassing said pressure reducer and said valve, an adjustable orifice and a fixed orifice in said second conduit in series relationship, temperature responsive means for decreasing the size of said adjustable orifice with increase in temperature, pressure operated means subjected to the pressure between said orifices for actuating said gas regulating valve to decrease the amount of gas supplied to said burner with increase in temperature, and a second pressure operated means subjected to the pressure in said first conduit, said second fluid pressure operated means when subjected to pressure being positioned in the path of movement of the first pressure operated means for limiting the movement thereof in a direction to close said valve.

5. In a device for regulating the amount of gas supplied from a source of gas under pressure to a gas burner, a diaphragm chamber having a pair of spaced diaphragms positioned therein, a gas regulating valve operated by one of said diaphragms, said valve operating diaphragm being subjected to gas pressure, temperature responsive means for controlling said gas pressure, the other of said diaphragms being subjected to gas pressure from said gas source, said other diaphragm, when subjected to said pressure from said source, being positioned to limit the movement of said valve operating diaphragm in the direction to close said valve, but permitting complete movement thereof when said gas pressure fails.

6. In a device for regulating the amount of gas supplied from a source of gas under pressure to a gas burner, a diaphragm chamber having a pair of spaced diaphragms positioned therein, a gas regulating valve operated by one of said diaphragms, said valve operating diaphragm being subjected to gas pressure, temperature responsive means for controlling said gas pressure, the other of said diaphragms being subjected to gas pressure from said gas source, said other diaphragm, when subjected to said pressure from said source, being positioned to limit the movement of said valve operating diaphragm in the direction to close said valve, but permitting complete movement thereof when said gas pressure fails, and a latch adapted to engage a member moved by said valve operating diaphragm when complete movement thereof occurs to lock said valve in closed position until manually released.

THOMAS EUGENE WOOD.